United States Patent [19]
de Magny

[11] Patent Number: 5,345,480
[45] Date of Patent: Sep. 6, 1994

[54] COOLING DEVICE WHICH CAN BE FITTED ONTO A REMOTE MANIPULATION ARM AND ITS UTILIZATION FOR AN OPERATION IN A HOSTILE MEDIUM AT A HIGH TEMPERATURE

[75] Inventor: Emmanuel de Magny, Lyons, France

[73] Assignee: Framatome, Courbevoie, France

[21] Appl. No.: 951,793

[22] Filed: Sep. 28, 1992

[30] Foreign Application Priority Data

Sep. 30, 1991 [FR] France ............... 91 11999

[51] Int. Cl.$^5$ .................................. G21C 9/00
[52] U.S. Cl. ........................... 376/291; 376/290
[58] Field of Search ............ 376/210, 291, 290; 976/DIG. 165; 218/568.1

[56] References Cited

U.S. PATENT DOCUMENTS

| | | | |
|---|---|---|---|
| 4,436,950 | 3/1984 | Gaffal et al. | 174/11 BH |
| 4,577,127 | 3/1986 | Ferree et al. | 310/83 |
| 4,643,871 | 2/1987 | Fajeau | 376/282 |
| 4,832,904 | 5/1989 | Thevenin | 376/299 |

FOREIGN PATENT DOCUMENTS

0245530A1 11/1987 European Pat. Off.
3728099A1 3/1988 Fed. Rep. of Germany.

*Primary Examiner*—Donald P. Walsh
*Assistant Examiner*—Meena Chelliah
*Attorney, Agent, or Firm*—Pollock, Vande Sande & Priddy

[57] ABSTRACT

The remote manipulation arm includes rigid sections (12, 14, 16) kept at a temperature adapted to their operation by a device comprising a vessel (37, 38, 39) surrounding each rigid section (12, 14, 16) and connected to a high-pressure coolant gas source. The vessel comprises two chambers (92, 94), respectively at high and low pressure, connected together by a discharge hole (102) for the gas. The rigid sections (12, 14, 16) are linked together by joints surrounded by bellows seals (40, 42) supplied by coolant gas from the low-pressure chamber (94) of a vessel (37, 38, 39) adjacent to the bellows seal. The gas circulates in a closed circuit comprising the chambers (92, 94) and the bellows seals (40, 42), absorbing the heat propagated through the remote manipulation arm.

21 Claims, 2 Drawing Sheets

COOLING DEVICE WHICH CAN BE FITTED ONTO A REMOTE MANIPULATION ARM AND ITS UTILIZATION FOR AN OPERATION IN A HOSTILE MEDIUM AT A HIGH TEMPERATURE

FIELD OF THE INVENTION

The present invention relates to a cooling device which can be fitted onto a remote manipulation arm and its utilization for an operation in a hostile medium at high temperature.

The invention applies in particular to a cooling device for a remote manipulation arm for use in a fast neutron reactor.

BACKGROUND OF THE INVENTION

This type of reactor includes a core, disposed at the center of a tank, the upper part of the latter being closed by a slab on which the tank is suspended. The core is immersed in liquid sodium used as the coolant fluid. A sodium-compatible blanket gas, usually argon, occupies the free space of the tank between the liquid sodium level and the slab. The blanket gas constitutes a radioactive environment, at a high temperature, and containing sodium aerosols.

After a shutdown of the reactor, in particular to carry out normal operations for maintenance of the fuel assemblies, the temperature of the blanket gas is reduced to approximately 150°. This temperature corresponds to that which those skilled in the art call a cold shutdown of the reactor.

During these shutdowns, the normal maintenance operations are carried out by using means adapted to maintenance of the fuel assemblies. Outside these normal operations, it is possible to carry out exceptional work in the radioactive parts of the reactor, for example disposing a video camera in the blanket gas, which necessitates the work of a robot or of a jointed remote manipulation arm which can move analogously to a human arm. The type of remote manipulation arm, for which the device which is the subject of the invention is designed, can operate normally in radioactive media but it is in general unfit for high temperatures, in particular for the temperature of the blanket gas at the time of a cold shutdown of the reactor.

SUMMARY OF THE INVENTION

It is an object of the invention to perform exceptional work in a radioactive medium at a high temperature, for example in the blanket gas of a nuclear reactor tank at the time of a cold shutdown of the latter, by using a remote manipulation arm, of known type, which was not designed to operate at the high temperature, and to do this while conserving much of the range of rotational movement and displacement of the remote manipulation arm.

For this purpose, the subject of the invention is a device for cooling, by circulation of a coolant gas, a remote manipulation arm comprising at least one rigid section, including a rigid vessel, disposed around the external wall of the rigid section, connected to a high-pressure coolant gas source. This vessel comprises two chambers, respectively at high and low pressure, connected together by pressure-reduction means for the gas, the high-pressure chamber being fitted with an intake opening for the high-pressure gas and the low-pressure chamber being fitted with a discharge opening for the low-pressure gas outside this chamber.

According to other characteristics of the invention:
the high-pressure and low-pressure chambers are substantially annular and coaxial so as to define an internal chamber surrounding the external wall of the rigid section and an external chamber surrounding the internal chamber;
the internal chamber is the high-pressure chamber;
the two internal and external chambers are separated by a partition wall and the pressure-reduction means comprise at least one calibrated hole passing through this wall;
the intake opening for the gas of the high-pressure chamber and the discharge opening for the gas of the low-pressure chamber are disposed in the vicinity of the same end of the rigid vessel and the calibrated hole is disposed in the vicinity of the opposite end of the vessel;
the external wall of the external chamber is covered, at least partially, with a thermal insulator;
the insulator comprises an internal layer of silicone and an external layer of stainless steel gauze.

The device according to the invention is applied to cooling of a remote manipulation arm comprising at least two rigid sections linked together by a joint.

According to particular characteristics of this device:
it includes a deformable vessel or bellows seal, disposed around the joint, fitted with a gas intake hole, communicating with the low-pressure chamber of one of the rigid sections linked by the joint, and a discharge hole for the gas outside the deformable vessel;
the gas intake hole in the bellows seal is made in a wall attached to a first rigid section and the discharge hole for the gas of the bellows seal is made in a wall attached to the second rigid section linked to the first by the joint;
reinforcing rings are disposed in the corrugations of the bellows seal;
the bellows seal is covered, on its outer surface, with a thermal insulation coating;
the coating of the bellows seal comprises a layer of silicone;
the rigid vessels are connected to the high-pressure coolant gas source by separate supply pipes;
the high-pressure and low-pressure chambers are connected to a pneumatic circuit in which the coolant gas circulates in closed circuit.

The device according to the invention is applied to cooling a remote manipulation arm comprising at least one exothermic member disposed substantially on the axis of one rigid section.

According to one characteristic of this device the latter includes at least one substantially flat thermal shield assembly, disposed approximately perpendicular to the axis of the rigid section, in the vicinity of the exothermic member.

The subject of the invention is also the utilization of the aforementioned device for cooling a remote manipulation arm operating in a hostile and confined medium at a high temperature.

According to characteristics of this utilization:
the hostile medium is the blanket gas of a fast neutron reactor, at the time of a cold shutdown of this reactor;
the cooling gas is compatible with the blanket gas;
the coolant gas comprises nitrogen.

According to one variation of this utilization: the coolant gas comprises argon.

BRIEF DESCRIPTION OF THE DRAWINGS

An embodiment of the invention will now be described below with reference to the attached drawings, in which.

DESCRIPTION OF PREFERRED EMBODIMENT

Figure 1:
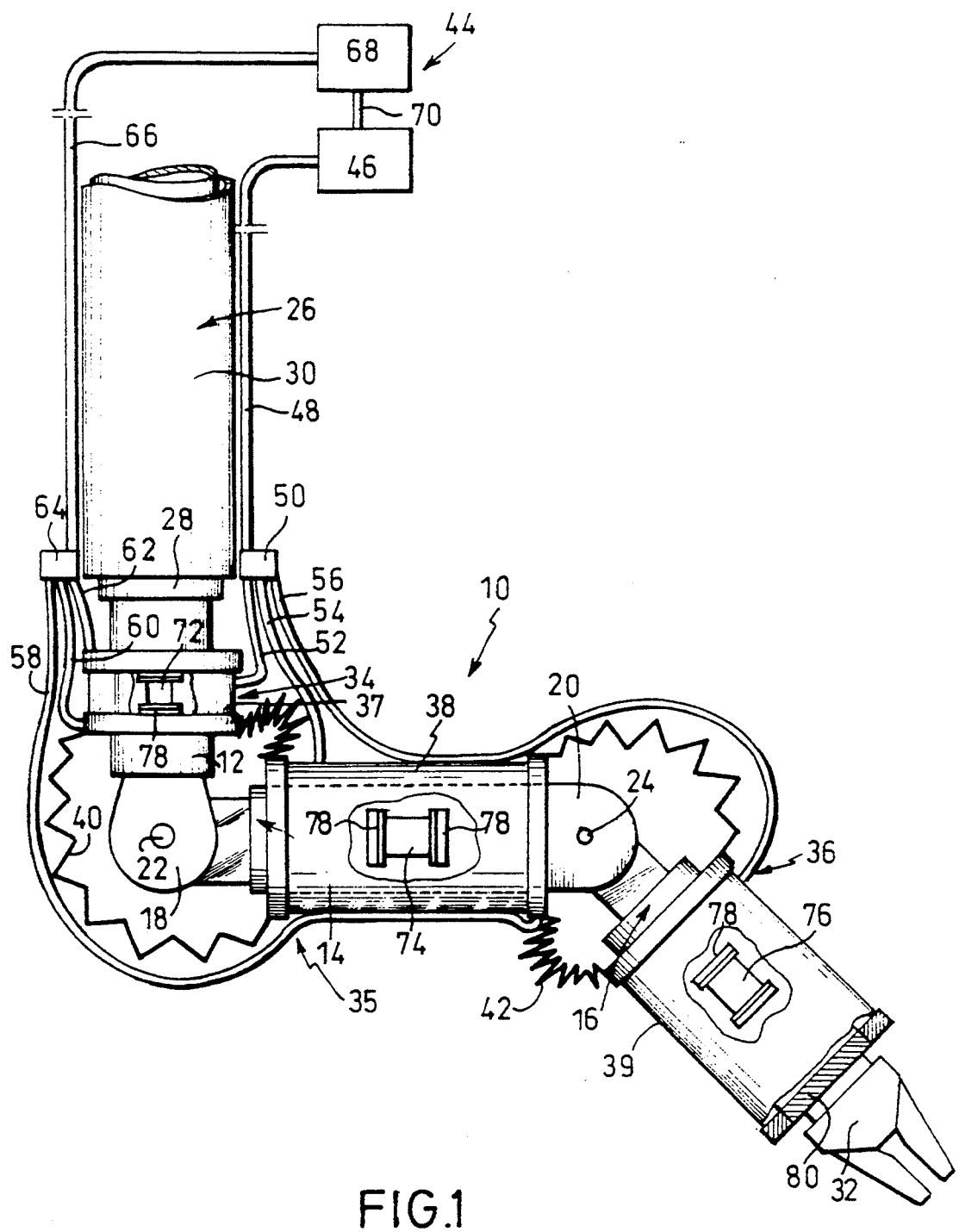
FIG. 1 is a schematic view in elevation, with some parts cut away, of a remote manipulation arm fitted with a cooling device according to the invention.

FIG. 1 schematically represents a remote manipulation arm 10, of known type, intended to be used for exceptional work in the blanket gas of a fast neutron reactor tank, at the time of a cold shutdown of the reactor. This remote manipulation arm 10 is adapted to the ambient radioactivity normally existing in the blanket gas.

The remote manipulation arm 10 comprises three rigid sections 12, 14, 16 linked together by two joints 18, 20 fitted with respective pivoting axes 22, 24. The remote manipulation arm constitutes a jointed assembly. Normally, the proximal section 12 is called the shoulder, the median section 14 is called the arm and the distal section 16 is called the forearm. The shoulder 12 is fixed on to a telescopic support 26 of which two cylindrical elements 28, 30 are represented, the element 28, carrying the shoulder 12, being represented in the retracted position in the element 30.

The forearm 16 carries on its free end a pincer 10 32 intended to hold, for example, a tool or a viewing means (not shown).

The rigid sections 12, 14, 16 normally include members whose operation is planned for temperatures not exceeding 50°. The temperature of the blanket gas is approximately 150° C. at the time of a cold shutdown of the reactor. In order to overcome excessive heating of its members, the remote manipulation arm is fitted with cooling devices 34, 35, 36 according to the invention. These devices respectively comprise rigid vessels 37, 38, 39, of general cylindrical shape, surrounding the rigid sections 12, 14, 16, inside which a cooling gas circulates which is compatible with the blanket gas. The rigid vessel 38 surrounding the arm 14, is shown in more detail in FIGS. 2 and 3 and will be described hereinbelow.

With the same purpose of utilization, the cooling devices 35, 36 comprise, in addition to the rigid vessels 38, 39, deformable vessels or annular bellows seals 40, 42 respectively surrounding the joints 18, 20. These bellows seals 40, 42 respectively include means of communication with the rigid vessels 38, 39, allowing them to be supplied with coolant gas.

FIG. 1 also shows that the rigid vessels 12, 14, 16 and the bellows seals 40, 42 are connected to a pneumatic circuit 44 in which the coolant gas circulates in closed circuit. This circuit 44 comprises a compressor 46 discharging the coolant gas at a high pressure of approximately 40 bar in an umbilical supply pipe 48. This pipe 48 is connected to a pressure reducer 50 disposed in proximity to the parts of the remote manipulation arm to be cooled. The pressure reducer 50 reduces the pressure of the coolant gas to approximately 5 bar. The rigid vessels 37, 38, 39 are respectively supplied with coolant gas by flexible supply pipes 52, 54, 56 connected to the output of the pressure reducer 50. The pressure of the coolant gas is reduced inside the rigid vessel by means to be described hereinbelow.

Two flexible discharge pipes 58, 60 for the reduced-pressure gas coming from bellows seals 40, 42 and a flexible discharge pipe 62 for the reduced-pressure gas coming from the rigid vessel 37 surrounding the shoulder are connected to the same manifold 64 linked to an umbilical discharge pipe 66. This pipe 66 returns the coolant gas, after being heated, into a refrigeration unit 68 in which it is cooled and then returned through a pipe 70 into the compressor 46.

FIG. 1 also shows that exothermic members 72, 74, 76, for example motors intended to pivot the rigid sections round their joints or to actuate a tool, which are schematically represented by rectangles, are disposed inside the rigid sections 12, 14, 16.

Thermal shield assemblies 78, of general flat shape, made of an insulating material, are disposed on either side of the exothermic members 72, 74, 76, approximately perpendicular to the longitudinal axis of the rigid sections which carry them. These shield assemblies obstruct the axial propagation of the heat emitted by the exothermic members. It is obvious that these shield assemblies can have different shapes adapted to the shape of the members which they surround.

With the same aim, the free end of the forearm 16 includes a disc 18 made of an insulating material, disposed perpendicular to the axis of the forearm 16, acting as a shield to the axial heat received from the medium and transmitted by the pincer.

Figure 2:
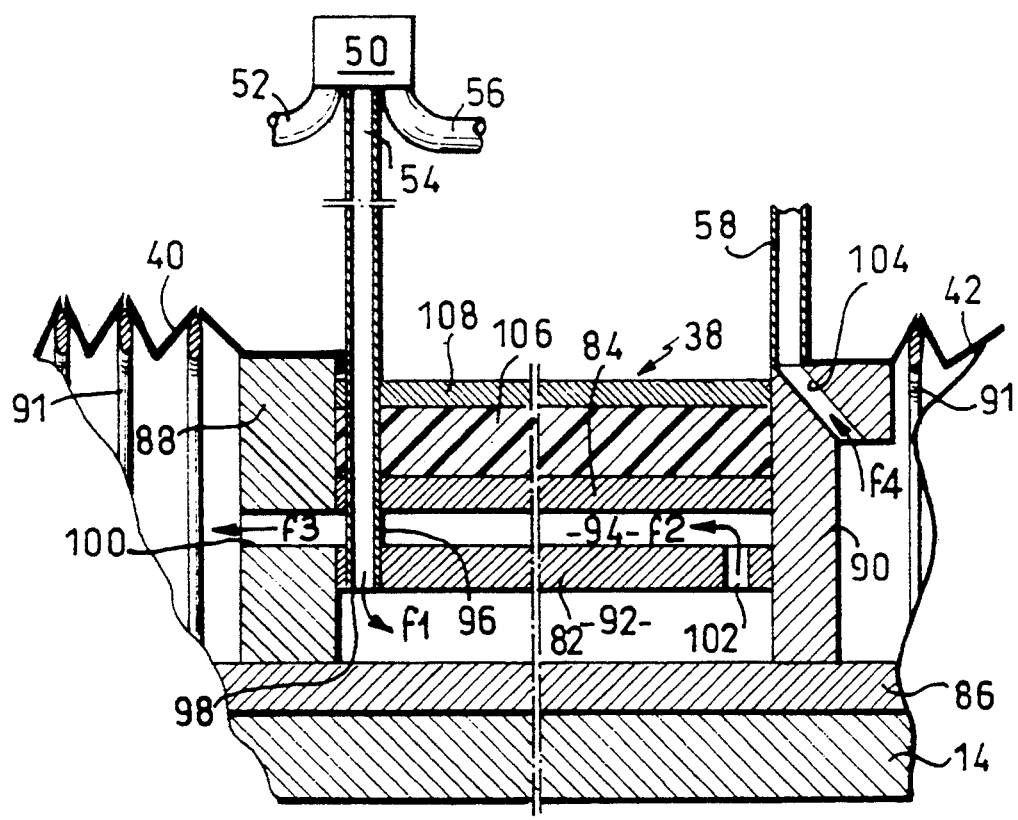
FIG. 2 is a schematic view in longitudinal section of a rigid vessel of the cooling device according to the invention surrounding a rigid section of the remote manipulation arm.

FIG. 2 schematically represents the rigid vessel 38 surrounding the arm 14. The vessel 38 comprises two coaxial cylindrical walls 82, 84, one internal and the other external, disposed around a sleeve 86 or base covering the wall of the arm 14. These coaxial walls 82, 84 extend longitudinally between two end discs 88, 90.

The end discs 88, 90 form supports for the annular bellows seals 40, 42. One of the two ends of the annular bellows seal 40 is fitted over and fixed on to the peripheral edge of the end disc 88. In the same way, one of the two ends of the bellows seal 42 is fitted over and fixed onto the peripheral edge of the end disc 90. It is also seen in FIG. 2 that the bellows seals 40, 42 include reinforcing rings 91 disposed in their corrugations.

The internal cylindrical wall 82 delimits an internal chamber 92 between its internal surface and the external surface of the base 86. The external cylindrical wall 84, coaxial with the internal wall 82, delimits an external chamber 94 between its internal surface and the external surface of the internal wall 82. This wall 82 is a partition for the internal and external chambers 92, 94.

The internal chamber 92 is connected to the flexible pipe 54 for supplying the vessel 38 with coolant gas through a pipe 96, extending the latter and opening into the internal chamber 92 by an intake opening for the gas 98. The external chamber 94 is linked to the volume delimited by the bellows seal 40 by a communication hole 100 passing axially through the end disc 88. The hole 100 is a coolant gas intake hole for the bellows seal 40.

The partition wall 82 separating the two chambers 92, 94 is fitted with holes 102 forming pressure-reduction means for the gas between these two chambers 92, 94.

These holes 102, of which only one is represented in FIG. 2, are spaced around the circumference of the partition wall 82 and pass through the latter radially. They are in addition calibrated so as to reduce the pressure of the coolant gas coming from the internal chamber 92 to a pressure close to that of the blanket gas, e.g., 1 bar, in which the remote manipulation arm 10 is operating.

The intake opening 98 for the gas and the 10 communication hole 100 are disposed in the vicinity of the end disc 88. The calibrated holes 102 are disposed at the other end of the vessel 38, in the vicinity of the end disc 90. The coolant gas circulates in the internal or high-pressure 92 in a generally axial direction, from left to right, and in the external or low-pressure chamber 92 in the opposite direction i.e., from right to left. The gas coming from the low-pressure chamber 94 is conveyed through the communication hole 100 in the bellows seal 40. The directions of flow of the gas in the high-pressure and low-pressure chambers are represented in FIG. 2 by the arrows f1, f2, f3.

It is also seen in FIG. 2 that the end disc 90, on which the bellows seal 42 is fixed, includes a discharge hole 104 for the low-pressure gas circulating in the bellows seal 42. The direction of the flow of the gas through the hole 104 is represented by the arrow f4. The hole 104 is connected to the flexible discharge pipe 58 for the reduced-pressure gas.

The shoulder 12 and the forearm 16, linked to the arm 14 by the joints 18, 20, respectively include rigid vessels 37, 39 similar to the vessel 38 of the arm 14, described above.

The end of the bellows seal 40 opposite to the end represented in FIG. 2 is fixed on an end disc, similar to the disc 90, carried by the shoulder 14 and fitted with a discharge hole for the gas out of the bellows seal. In the same way, the end of the bellows seal 42 opposite to the end shown in FIG. 2 is fixed on a disc, similar to the end disc 88, carried by the forearm 16 and fitted with a gas intake hole communicating with the low-pressure chamber of the vessel 39 disposed around the forearm 16.

Thus, the gas intake hole in each bellows seal 40, 42 is made in a disc attached to a first rigid section and the discharge hole for the gas of the bellows seal is made in a disc attached to a second rigid section linked to the first by the joint covered by the bellows seal.

The supply of coolant gas is independent for each rigid section 12, 14, 16. The vessel 39 surrounding the forearm 16 is supplied with coolant gas through pipe 56. The gas is reduced in pressure in the calibrated holes of the vessel 39. It is then conveyed into the bellows seal 42 surrounding the joint 20, then outside the bellows seal 42 through discharge pipe 58. The vessel 38 surrounding the arm 14 is supplied with coolant gas through pipe 54. The reduced-pressure gas coming from the low-pressure chamber 94 is conveyed into the bellows seal 40 surrounding the joint 18, then outside the bellows seal 40 through discharge pipe 60. The vessel 37 surrounding the shoulder 12 is supplied with coolant gas through pipe 52. The gas of the low-pressure chamber of the vessel 37 is conveyed directly into the discharge pipe 62.

Figure 3:
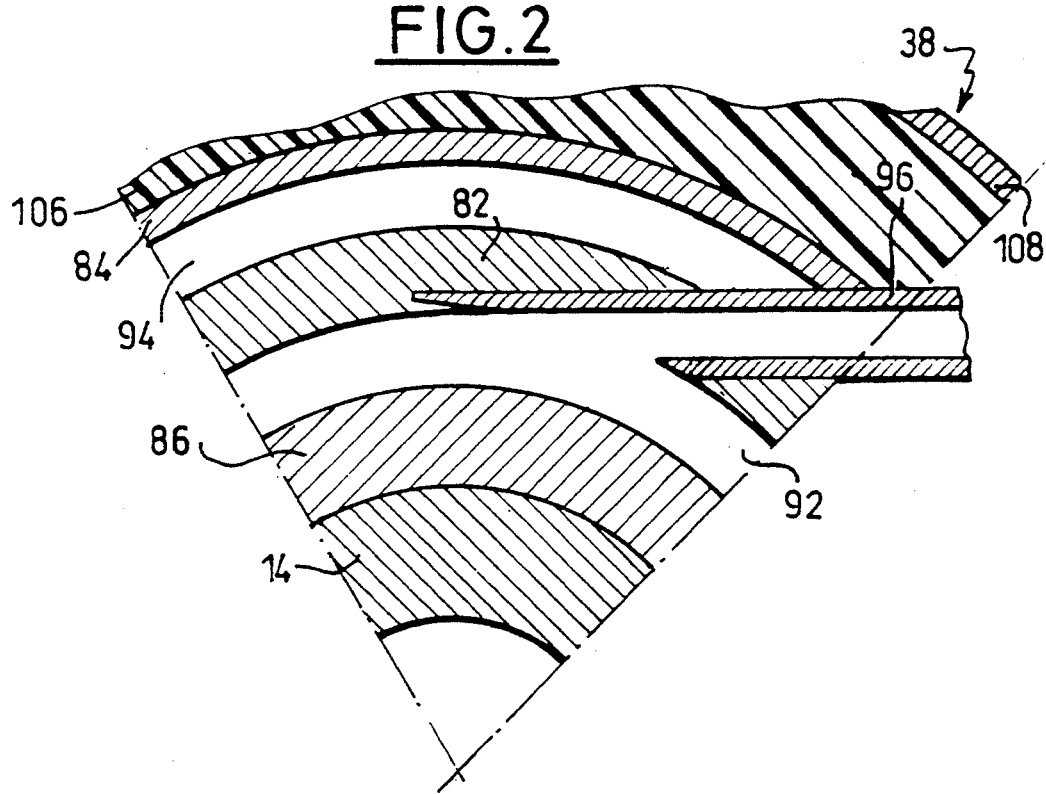
FIG. 3 is a partial schematic view in cross-section of this rigid vessel.

The representation of the supply pipe 96 in FIG. 2 does not correspond to reality but allows better comprehension of the circulation of the coolant gas in the vessel 38. FIG. 3 represents the actual position of the pipe 96 in which it extends tangentially from high-pressure chamber 92 so as to avoid the formation of a stop zone for the coolant gas, on the external surface of the base 86, which would risk causing heating of the latter.

It is seen in FIGS. 2 and 3 that the external wall 84 of the low-pressure chamber 94 is covered with two layers 106, 108 of thermal insulators. Similar layers of thermal insulator are disposed on the vessels 37, 39 of the shoulder 12 and the forearm 16. Bellows seals 40, 42 also include a thermal insulation coating (not shown).

In the example described, the blanket gas is argon. Nitrogen or argon itself may, for example, be chosen from the coolant gases compatible with argon. In the example described, the coolant gas used is nitrogen, whose utilization is well understood by those skilled in the art and whose specific heat is higher than that of argon.

The materials constituting the device according to the invention are compatible with the blanket gas (argon) and the coolant gas (nitrogen). In particular, the internal wall 82 and the external wall 84 respectively delimiting the internal chamber 92 and the external chamber 94 are made of austenitic stainless steel. The layers 106, 108 of thermal insulators are respectively made of silicone (internal layer) and stainless steel gauze (external layer) and the bellows seals 40, 42 include a thermal insulation coating made of silicone.

The remote manipulation arm 10 is subjected to a radial heat flux coming essentially from outside the remote manipulation arm and its exothermic members, and to an axial heat flux whose intensity is approximately ten times less than that of the radial heat flux.

The rigid sections 12, 14, 16 of the remote manipulation arm 10 must be maintained at a temperature lower than approximately 50° C. in order to be able to operate correctly. The layers of thermal insulators disposed around the rigid sections 12, 14, 16 and the thermal insulation coating disposed around the bellows seals 40, 42 act as shields to the radial heat flux coming from outside. The heat which passes through the layers of thermal insulators are removed by the coolant gas circulating in the internal and external chambers of the rigid vessels. In the same way, the coolant gas circulating in the bellows seals 40, 42 cools the joints 18, 20.

The two high-pressure and low-pressure chambers of the rigid vessels allow the coolant gas to circulate in a restricted volume, forming thermal plateaus between the inside of the remote manipulation arm and the blanket gas for effective cooling of the rigid sections. Thus, temperature gradients are not created and too high a speed is not imposed on the gas, causing heating of the latter by friction. The rigid vessels are therefore of small volume and allow almost complete conservation of the range of translation of the rigid sections of the remote manipulation arm.

The pressures of the gas in the high-pressure and low-pressure chambers of the rigid vessels are determined in particular by its mass flow rate necessary to remove the excess heat and by the dimensions of these chambers.

The pressure in the low-pressure chamber depends in particular on the existence of a connection of this chamber to an adjacent bellows seal, which is the case of the vessels surrounding the arm 14 and the forearm 16. The latter condition is imposed by the fact that, taking the example of the vessel 38 surrounding the arm 14, the nitrogen contained in the low-pressure chamber 94 is conveyed into the bellows seal 40 and that the pressure of the nitrogen inside the bellows seal must be limited with respect to the pressure of the medium, for example the pressure difference between inside and outside the bellows seal must not exceed 0.5 bar. The reinforcement rings 91 disposed in the corrugations of the bellows seals 40, 42 allow alleviation of the effects due to the pressure deviation on either side of the wall of the bellows seals.

The nitrogen circulating in the rigid vessels 37, 38, 39, allows absorption of the heat of the radial heat flux from both the blanket gas and the exothermic members, such as the motors, disposed inside the rigid sections 12, 14, 16.

The axial propagation of heat is slowed in particular by the thermal shield assemblies disposed in the axis of the hot members carried by the remote manipulation arm. In fact, the disc 80 made of insulating material protects the forearm 16 by acting as a shield to the axial heat flux generated by heating of the pincer 32 or by a tool carried by this pincer. In the same way the thermal shield assemblies 78, disposed in the axis of the rigid sections, on either side of the motors, reduce the axial propagation of heat emitted by these motors.

The nitrogen circulating in the bellows seals of the joints of the remote manipulation arm also reduces the axial heat flux which is propagated by these joints.

The coolant gas supply pipes 52, 54, 56 and the discharge pipes of this reduced-pressure gas 58, 60, 62 are linked to the same closed pneumatic circuit 44 in order to avoid any release of coolant gas into the blanket gas.

The device according to the invention allows adaptation of a remote manipulation arm to carry out exceptional work in the blanket gas of a fast neutron reactor.

The invention allows the rigid sections of the remote manipulation arm to be maintained at a temperature lower than that of the blanket gas, and adapted to their operation, while avoiding the formation of temperature gradients resulting from local cooling effects.

The device according to the invention can be fitted to existing remote manipulation arms and allows considerable extension of the application of these arms. The parameters of the pressure and flow rate of the coolant gas circulating in the device according to the invention can be regulated as a function of the temperature of the blanket gas and of the maximum operating temperature of the remote manipulation arm.

The invention is not limited to a utilization in the blanket gas of a fast neutron reactor. It also applies to hostile and confined media in the presence of high temperature, radiation or any other abnormal conditions necessitating containment and cooling of the remote manipulation arm.

In the same way, the invention is not limited to rigid sections and vessels with circular cross-sections. The invention may be applied to a remote manipulation arm comprising a single pole.

I claim:

1. Device for cooling, by circulation of a coolant gas, a jointed manipulation arm (10) comprising rigid sections (12, 14, 16) connected by joints, each section comprising a rigid tubular structure defining an external wall of said section, said device including a rigid vessel (37, 38, 39) fixedly mounted around the external wall of a rigid section, and connected to a high-pressure coolant gas source (50), said vessel (37, 38, 39) comprising a high-pressure chamber (92) and a low-pressure chamber (94) connected together by pressure-reduction means (102) for said gas, said high-pressure chamber (92) having an intake opening (98) for high-pressure gas and said low-pressure chamber (94) having a discharge opening (100) for low-pressure gas outside said low-pressure chamber, said high-pressure and low-pressure chambers (92, 94) being substantially annular and coaxial so as to define an internal chamber (92) surrounding said external wall of said rigid section (12, 14, 16) and an external chamber (94) surrounding the internal chamber (92).

2. Device according to claim 1, wherein said internal chamber (92) is said high-pressure chamber.

3. Device according to claim 1, wherein said internal and external chambers (92, 94) are separated by a partition wall (82) and said pressure-reduction means (102) comprise at least one calibrated hole (102) passing through said partition wall (82).

4. Device according to claim 3, wherein said intake opening (98) for the gas of said high-pressure chamber (92) and said discharge opening (100) for the gas of said low-pressure chamber (94) are disposed in the vicinity of the same end of said rigid vessel (37, 38, 39) and said calibrated hole (102) is disposed in the vicinity of an opposite end of said rigid vessel.

5. Device according to claim 1, wherein the external wall (84) of said external chamber (94) is covered, at least partially, with a thermal insulator (106, 108).

6. Device according to claim 5, wherein said insulator comprises an internal layer (106) of silicone and an external layer (108) of stainless steel gauze.

7. Device according to claim 1, wherein said jointed manipulation arm (10) comprises at least two rigid sections (12, 14, 16) connected together by a joint (18, 20), a bellows seal (40, 42), disposed around said joint (18, 20), fitted with a gas intake hole (100), communicating with said low-pressure chamber (94) of one of said rigid sections connected by said joint, and a discharge hole (104) for the gas outside said bellow seal (40, 42).

8. Device according to claim 7, wherein said gas intake hole (100) in said bellows seal (40, 42) is provided in a wall (88) attached to a first of said rigid sections (12, 14, 16) and said discharge hole (104) for the gas of said bellows seal (40, 42) is provided in a wall (90) attached to a second of said rigid sections (12, 14, 16) connected to said first rigid section by said joint (18, 20).

9. Device according to claim 7, comprising reinforcing rings (91) disposed in corrugations of said bellows seal (40, 42).

10. Device according to claim 7, wherein said bellows seal (40, 42) has an outer surface covered with a thermal insulation coating.

11. Device according to claim 10, wherein said coating of said bellows seals (40, 42) comprises a layer of silicone.

12. Device according to claim 7, wherein said rigid vessels (37, 38, 39) are connected to said high-pressure coolant gas source (50) by separate flexible supply pipes (52, 54, 56).

13. Device according to claim 1, wherein said high-pressure pressure and low-pressure chambers (92, 94) are connected to a pneumatic circuit (44) in which said coolant gas circulates in closed circuit.

14. Device according to claim 1, wherein an exothermic member (72, 74, 76) is disposed substantially on the axis of one rigid section, said device including at least one substantially flat thermal shield assembly (78, 80) disposed approximately perpendicular to the axis of said rigid section (12, 14, 16) in the vicinity of said exothermic member (72, 74, 76).

15. Use of a device according to claim 1 for cooling a jointed manipulation arm operating in a hostile and confined medium at a high temperature.

16. Use of a device according to claim 1, for cooling a jointed manipulation arm operating in a fast neutron reactor, said reactor comprising a core, disposed in a tank, having an upper part closed by a slab, said core being immersed in liquid sodium used as a coolant fluid, said reactor further comprising a sodium-compatible blanket gas occupying a free space of said tank between the liquid sodium level and said slab, the jointed manipulation arm with the device for cooling said jointed manipulation arm being placed in said blanket gas, the blanket gas being at a temperature corresponding to the conditions of a cold shutdown of the fast neutron reactor.

17. Use of a device according to claim 16, wherein said coolant gas is compatible with said blanket gas.

18. Use of a device according to claim 17, wherein said coolant gas comprises nitrogen.

19. Use of a device according to claim 17, wherein said coolant gas comprises argon.

20. Device according to claim 1, wherein said jointed manipulation arm comprises a rigid section comprising a rigid tubular structure defining an external wall of the section, one end of the rigid section being linked to means for displacing the rigid section, the other end of the rigid section comprising means for holding a tool, said device including a rigid vessel fixedly mounted around said external wall and connected to a high-pressure coolant gas source (50), said vessel comprising a high-pressure chamber (92) and a low-pressure chamber (94) connected together by pressure-reduction means (102) for said gas, said high-pressure chamber (92) having an intake opening (98) for high-pressure gas and said low-pressure chamber (94) having a discharge opening (100) for low-pressure gas outside said low-pressure chamber, said high-pressure and low-pressure chambers (92, 94) being substantially annular and coaxial so as to define an internal high-pressure chamber (92) surrounding said external wall of said rigid section and an external low-pressure chamber (94) surrounding the internal chamber (92).

21. Device according to claim 20, wherein said internal and external chambers (92, 94) are separated by a partition wall (82) and said pressure-reduction means (102) comprise at least one calibrated hole (102) passing through said partition wall (82).

* * * * *